United States Patent
Shim et al.

(10) Patent No.: US 9,835,906 B2
(45) Date of Patent: Dec. 5, 2017

(54) LIQUID CRYSTAL DISPLAY AND METHOD FOR MANUFACTURING THE SAME

(71) Applicant: Samsung Display Co., Ltd., Yongin, Gyeonggi-Do (KR)

(72) Inventors: Yi Seop Shim, Suwon-si (KR); Hee Ra Kim, Seoul (KR); Chang Soon Jang, Seoul (KR); Chul Huh, Yongin-si (KR)

(73) Assignee: Samsung Display Co., Ltd. (KR)

( * ) Notice: Subject to any disclaimer, the term of this patent is extended or adjusted under 35 U.S.C. 154(b) by 84 days.

(21) Appl. No.: 14/711,452

(22) Filed: May 13, 2015

(65) Prior Publication Data

US 2016/0202526 A1 Jul. 14, 2016

(30) Foreign Application Priority Data

Jan. 9, 2015 (KR) .................. 10-2015-0003669

(51) Int. Cl.
- *G02F 1/1339* (2006.01)
- *G02F 1/1362* (2006.01)
- *G02F 1/1343* (2006.01)
- *G02F 1/1368* (2006.01)

(52) U.S. Cl.
CPC .... *G02F 1/13394* (2013.01); *G02F 1/136209* (2013.01); *G02F 2001/13396* (2013.01); *G02F 2001/13398* (2013.01)

(58) Field of Classification Search
CPC .......... G02F 1/13394; G02F 1/136209; G02F 1/13396; G02F 1/13398
See application file for complete search history.

(56) References Cited

U.S. PATENT DOCUMENTS

| 2009/0180043 A1* | 7/2009 | Rho .................. G02F 1/13338 349/12 |
| 2010/0141875 A1* | 6/2010 | Shim ................. G02F 1/133516 349/106 |
| 2013/0329155 A1* | 12/2013 | Kwak .................... G02F 1/136 349/43 |

FOREIGN PATENT DOCUMENTS

| KR | 10-2002-0026100 | 4/2002 |
| KR | 10-2006-0093971 | 8/2006 |
| KR | 10-2013-0039581 | 4/2013 |

* cited by examiner

Primary Examiner — Duy T Nguyen
Assistant Examiner — Mounir Amer
(74) Attorney, Agent, or Firm — Innovation Counsel LLP

(57) ABSTRACT

A liquid crystal display according to an exemplary embodiment of the present inventive concept includes: a first insulating substrate; a thin film transistor disposed on the first insulating substrate; a light blocking member disposed on the thin film transistor; and a spacer disposed on the light blocking member, wherein the spacer includes a main column spacer and a sub column spacer, and the sub column spacer is disposed between the main column spacer and has a stripe shape which extends in parallel to a gate line of the thin film transistor.

10 Claims, 6 Drawing Sheets

LIQUID CRYSTAL DISPLAY AND METHOD FOR MANUFACTURING THE SAME

CROSS-REFERENCE TO RELATED APPLICATION

This application claims priority to and the benefit of Korean Patent Application No. 10-2015-0003669 filed in the Korean Intellectual Property Office on Jan. 9, 2015, the entire contents of which are incorporated herein by reference.

BACKGROUND (a) Field

The embodiment of the present inventive concept relates to a liquid crystal display and a method for manufacturing the same.

(b) Description of the Related Art

As a display device, a flat panel display may be used. As the flat panel display, various display devices such as a liquid crystal display, an organic light emitting display, a plasma display, an electrophoretic display, an electrowetting display, and the like may be used.

The liquid crystal display, which is one of the most widely used flat panel displays, includes two sheets of display panels on which electrodes are formed and a liquid crystal layer interposed therebetween. The liquid crystal display displays an image by applying a voltage to the electric field generating electrodes to generate an electric field on the liquid crystal layer and consequently, determining an orientation of liquid crystal molecules in the liquid crystal layer and controlling polarization of incident light.

One that is currently and mainly used among the liquid crystal displays is a structure in which electric field generating electrodes such as pixel electrodes, common electrodes, and the like are formed in each of the two display panels. Among these, a structure is mainly used in which a plurality of thin film transistors and the pixel electrodes are arranged in a matrix form on one display panel (hereinafter, referred to as 'thin film transistor display panel') and color filters of red, green, and blue are formed on the other display panel (hereinafter, referred to as 'common electrode display panel') and front surfaces of the color filters are covered by the common electrode.

Since the above-mentioned liquid crystal display has the pixel electrodes and the color filters that are formed on different display panels, it is difficult to perform an accurate alignment between the pixel electrodes and the color filters, thereby causing alignment error. In order to solve the above-mentioned problem, a structure in which a light blocking member is formed on the same display panel as the pixel electrodes and the thin film transistor has been proposed. In this case, the color filter may also be formed on the same display panel as the pixel electrodes.

An interval between liquid crystal layers between the two display panels is referred to as a cell gap, wherein the cell gap has an effect on overall operation characteristics of the liquid crystal display such as response speed, contrast ratio, angle of view, luminance, uniformity, and the like. If the cell gap is not constant, a uniform image is not displayed across the entire screen, thereby causing image quality degradation. Therefore, in order to maintain a uniform cell gap across the entire region on the substrate, one of two substrates is provided with a spacer. As the above-mentioned spacer, a column spacer (CS) has been well used.

For process simplification, the light blocking member such as a black matrix and the spacer may be simultaneously formed. In order to simultaneously form the light blocking member and the spacer, it is required to form a multi-step in the light blocking member and the spacer forming material.

Conventionally, the light blocking member and the spacer are formed simultaneously by using a multi-tone mask having areas of different light transmittance characteristics. However, since it is difficult to manufacture the multi-tone mask, cost for manufacturing the liquid crystal display is increased. Moreover it is difficult to form a sub column spacer along with the light blocking member and the main column spacer using the multi-tone mask.

The above information disclosed in this Background section is only for enhancement of understanding of the background of the inventive concept and therefore it may contain information that does not form the prior art.

SUMMARY

The present inventive concept has been made in an effort to provide a liquid crystal display and a method for manufacturing the same having advantages capable of simultaneously forming a light blocking member and a spacer and implementing a multi-step.

An exemplary embodiment of the present inventive concept provides a liquid crystal display including: a first insulating substrate; a thin film transistor disposed on the first insulating substrate; a light blocking member disposed on the thin film transistor; and a spacer disposed on the light blocking member, wherein the spacer includes a main column spacer and a sub column spacer, and the sub column spacer is disposed between the main column spacer and has a stripe shape which extends in parallel to a gate line of the thin film transistor.

A horizontal center line of the main column spacer and a horizontal center line of the sub column spacer may correspond to each other.

The light blocking member may include: a first light blocking member extended along a data line of the thin film transistor; and a second light blocking member extended along the gate line of the thin film transistor.

The sub column spacer may have a width smaller than that of the second light blocking member.

The main column spacer may be disposed on the first light blocking member or the second light blocking member and the sub column spacer may be disposed on the second light blocking member.

The main column spacer may be formed on a portion in which the first light blocking member and the second light blocking member intersect with each other.

The light blocking member and the spacer may be formed of the same material.

The sub column spacer may have a height higher than a height of the light blocking member and lower than a height of the main column spacer.

The liquid crystal display may further include: a first electrode disposed on the thin film transistor; and a second electrode disposed so as to have a passivation layer between the first electrode and the second electrode.

The first electrode may have a planar shape formed on a front surface of the pixel region, the second electrode may include a plurality of branch electrodes, and the plurality of branch electrodes may be overlapped with the first electrode of the planar shape.

Another embodiment of the present inventive concept provides a method for manufacturing a liquid crystal display including: forming a thin film transistor including a gate line and a data line on a first insulating substrate; forming a color filter on the thin film transistor; forming a light blocking member and a spacer on the color filter; and forming a second insulating substrate facing the first insulating substrate, wherein the spacer includes a main column spacer and a sub column spacer, and the sub column spacer is disposed between the main column spacer and has a stripe shape which extends in parallel to a gate line of the thin film transistor.

The sub column spacer may extend to cover substantially all the region between the main column spacers.

The forming of the light blocking member and the spacer on the color filter may include: forming the main column spacer and the sub column spacer so that horizontal center lines of each of the main column spacer and the sub column spacer on the color filter correspond to each other.

The forming of the light blocking member and the spacer on the color filter may include: forming a first light blocking member extending along the data line and a second light blocking member extending along the gate line.

The forming of the light blocking member and the spacer on the color filter may include: forming the main column spacer on the first light blocking member or the second light blocking member and forming the sub column spacer on the second light blocking member.

The main column spacer may be disposed on a portion in which the first light blocking member and the second light blocking member intersect with each other.

The method may further include: forming a first electrode on the thin film transistor; and forming a second electrode so as to have a passivation layer between the first electrode and the second electrode.

The first electrode may have a planar shape formed on a front surface of the pixel region and the second electrode may include a plurality of branch electrodes, and the plurality of branch electrodes may overlap the first electrode of the planar shape.

According to an embodiment of the present inventive concept, since the liquid crystal display may simultaneously form the light blocking member and the spacer, the manufacturing process may be simplified and pattern stability of the spacer may be implemented.

Other effects that may be obtained or predicted from the exemplary embodiments of the present inventive concept will be explicitly or implicitly disclosed in the detailed description of the exemplary embodiments of the present inventive concept. That is, various effects predicted according to the exemplary embodiments of the present inventive concept will be disclosed in the detailed description to be described below.

DETAILED DESCRIPTION OF THE EMBODIMENTS

Figure 1:
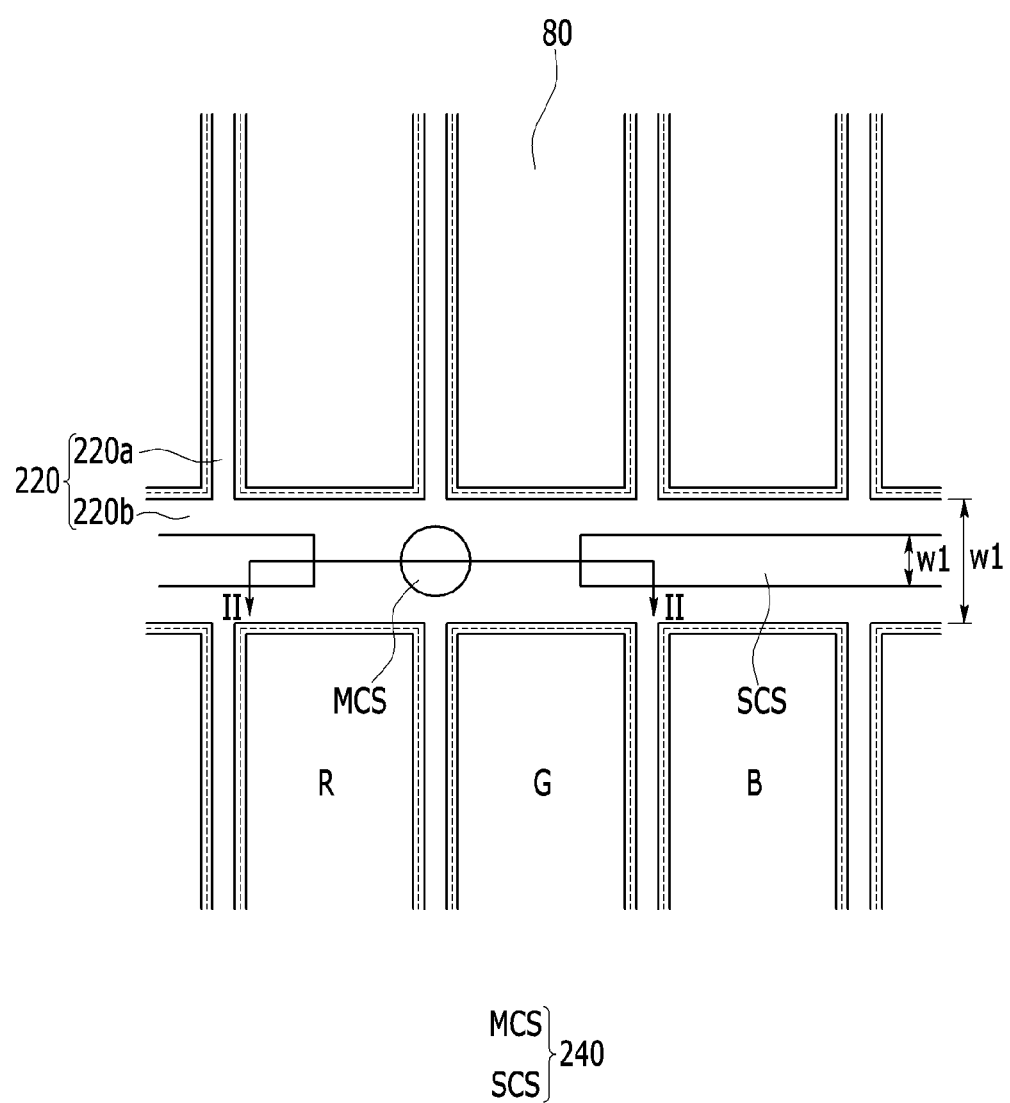
FIG. 1 is a plan view showing a liquid crystal display according to an exemplary embodiment of the present inventive concept.

Exemplary embodiments of the present inventive concept will be described in detail with reference to the accompanying drawings. However, the present inventive concept is not limited to the exemplary embodiments which are described herein, and may be modified in various different ways. Rather, the exemplary embodiments of the present inventive concept to be described below are provided so that the idea of the present inventive concept can be sufficiently transferred to those skilled in the art to which the present inventive concept pertains.

In the drawings, thicknesses of layers and regions are exaggerated for clarity. In addition, in the case in which it is stated that a layer is present 'on' another layer or a substrate, the layer may be directly formed on another layer or the substrate or have the other layer interposed therebetween. Portions denoted by like reference numerals mean like elements throughout the specification.

Hereinafter, exemplary embodiments of the present inventive concept will be described in detail with reference to the accompanying drawings.

Figure 2:
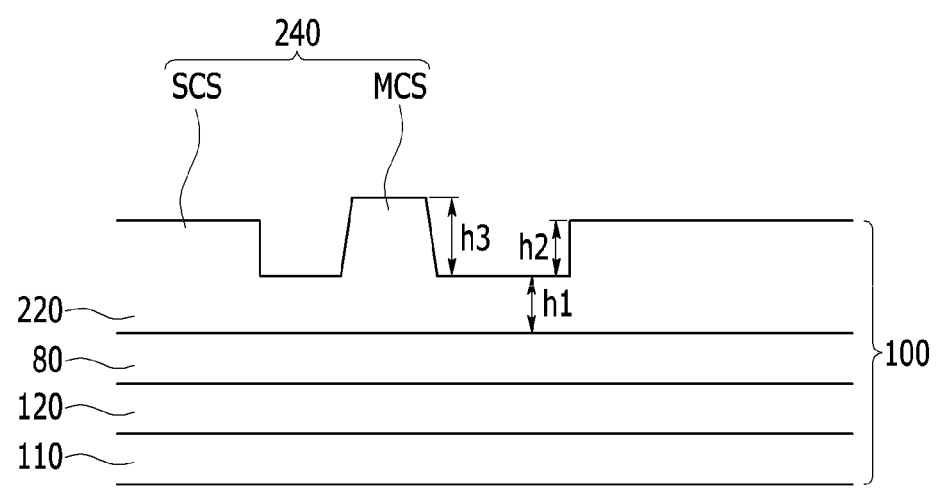
FIG. 2 is a cross-sectional view taken along a cutting plane line II-II of FIG. 1.

FIG. 1 is a plan view showing a liquid crystal display according to an exemplary embodiment of the present inventive concept and FIG. 2 is a cross-sectional view taken along a cutting plane line II-II of FIG. 1.

Referring to FIGS. 1 and 2, a layer structure 120 including a thin film transistor (TFT) is disposed on a lower substrate 110.

The thin film transistor, which is a switching element, may have three terminals including a control terminal, an input terminal, and an output terminal. A detailed description thereof will be provided below.

A plurality of color filters 80 are disposed on the layer structure 120. The plurality of color filters 80 includes a red color filter R, a green color filter G, and a blue color filter B. However, although only the red color filter R, the green color filter G, and the blue color filter B are illustrated for convenience of explanation in this specification, color filters 80 representing other colors may also be further included.

The plurality of color filters 80 may be formed in a horizontal direction so as to be in parallel to each other or may be formed in a stripe shape along a vertical direction. The plurality of color filters 80 described above may have a predetermined portion overlapping each other or may be formed so as to be spaced apart from each other by a predetermined interval.

A light blocking member 220 may be disposed on the plurality of color filters 80. The light blocking member 220 includes a first light blocking member 220a and a second light blocking member 220b. An edge of the light blocking member 220 may be formed so as to overlap an edge of the color filter 80.

The first light blocking member 220a may extend along a vertical direction. Although not shown, the first light blocking member 220a may be disposed along a direction in which a data line of the thin film transistor extends.

The second light blocking member 220b may extend along a horizontal direction. Although not shown, the second light blocking member 220b may be disposed along a direction in which a gate line of the thin film transistor extends. The above-mentioned second light blocking member 220b may be formed so as to intersect with the first light blocking member 220a.

A spacer 240 is disposed on the light blocking member 220. The spacer 240 includes a main column spacer (MCS) and a sub column spacer (SCS). The spacer 240 may be formed of the same material as that of the light blocking member 220.

The main column spacer (MCS) is disposed on the first light blocking member 220a or the second light blocking member 220b. That is, the main column spacer (MCS) may be disposed on a portion in which the first light blocking member 220a and the second light blocking member 220b intersect with each other.

The main column spacer (MCS) may have a cross-section which is formed in a circular shape or an oval shape.

The sub column spacer (SCS) is disposed so as to correspond to the main column spacer (MCS). That is, the sub column spacer (SCS) is disposed between the main column spacer (MCS) and a horizontal center line of the sub column spacer (SCS) may correspond to a horizontal center line of the main column spacer (MCS).

The sub column spacer (SCS) is disposed on the second light blocking member 220b. The sub column spacer (SCS) may have a shape in which it extends along a direction in which the gate line of the thin film transistor extends. That is, the sub column spacer (SCS) may be formed so as to be in parallel to the gate line of the thin film transistor. The sub column spacer (SCS) may extend to cover substantially all the region between the main column spacers (MCSs).

The sub column spacer (SCS) may have a width w1 smaller than a width w2 of the second light blocking member 220b.

The sub column spacer (MCS) may have a cross-section which is formed in a rectangular shape, as described in the FIGS. 1 and 2. However, the shape of the cross-section of the sub column spacer (SCS) is not limited thereto, but may also be formed in a polygonal shape including the rectangular shape, a trapezoidal shape, a dumbbell shape, and an oval shape (not shown). The rectangular shape and the trapezoidal shape may have rounded top corners.

The sub column spacer (SCS) may be formed so as to have a height (h1+h2) lower than a height (h1+h3) of the main column spacer (MCS) and higher than a height h1 of the light blocking member 220. That is, among the main column spacer (MCS), the sub column spacer (SCS), and the light blocking member 220, the main column spacer (MCS) is formed so as to have the highest height (h1+h3) and the light blocking member 220 may be formed so as to have the lowest height h1.

As described in FIGS. 1 and 2, according to the present exemplary embodiment, since the main column spacer (MCS) and the sub column spacer (SCS) are formed at a position corresponding to each other and the sub column spacer (SCS) has a rectangular pattern in a plan view, it is possible to implement pattern stability.

Figure 3:
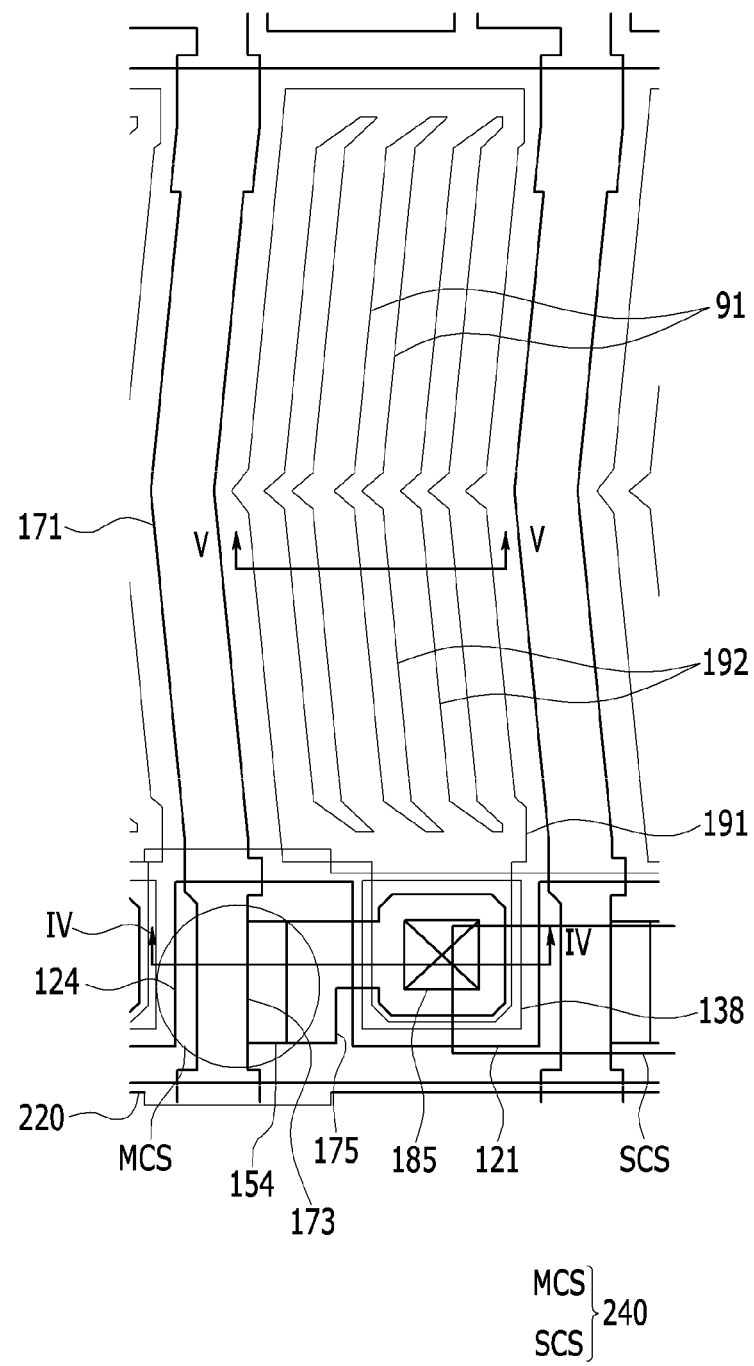
FIG. 3 is a view showing a liquid crystal display specifying the exemplary embodiment of FIG. 1.
Figure 4:
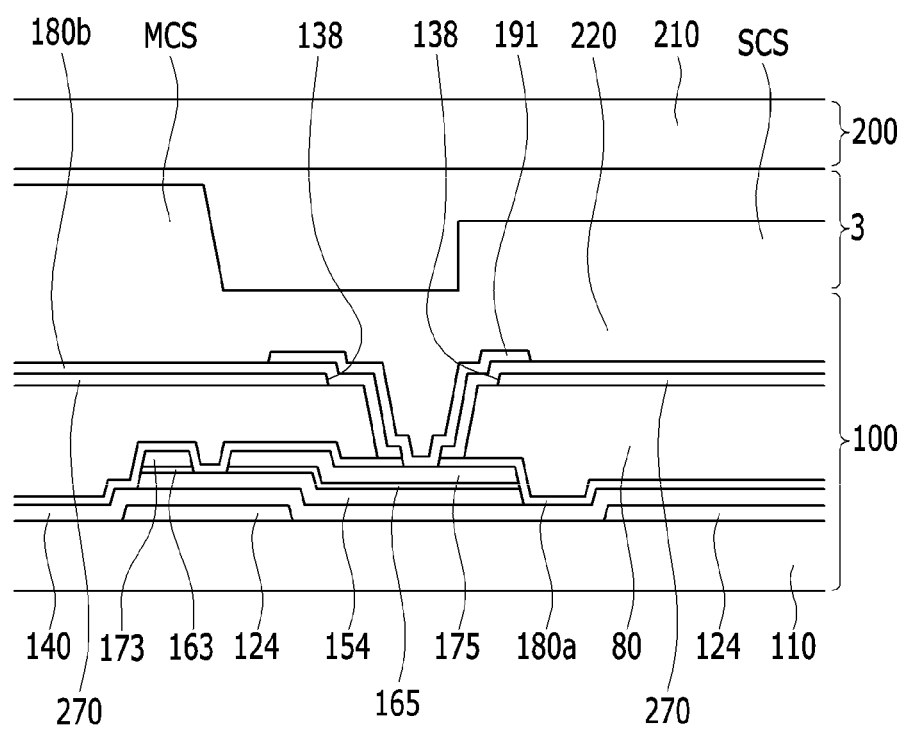
FIG. 4 is a cross-sectional view taken along a cutting plane line IV-IV of FIG. 3.
Figure 5:
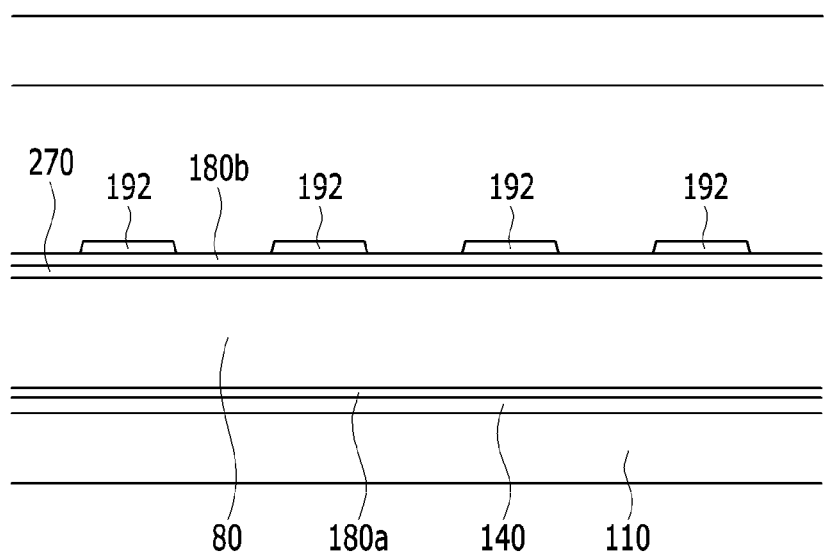
FIG. 5 is a cross-sectional view taken along a cutting plane line V-V of FIG. 3.

FIG. 3 is a view showing a liquid crystal display specifying the exemplary embodiment of FIG. 1, FIG. 4 is a cross-sectional view taken along a cutting plane line IV-IV of FIG. 3, and FIG. 5 is a cross-sectional view taken along a cutting plane line V-V of FIG. 3.

Referring to FIGS. 3 to 5, a liquid crystal display according to the present exemplary embodiment includes a lower display panel 100 and an upper display panel 200 that face each other, and a liquid crystal layer 3 disposed therebetween.

First, the lower display panel 100 will be described.

A gate conductor including a gate line 121 is formed on a first insulating substrate 110 made of transparent glass, plastic, or the like.

The gate line 121 includes a gate electrode and a wide end portion (not shown) for allowing a connection with other layers or external driving circuits. The gate line 121 may be made of an aluminum (Al) based metal such as aluminum, an aluminum alloy, or the like, a silver (Ag) based metal such as silver, a silver alloy, or the like, a copper (Cu) based metal such as copper, a copper alloy, or the like, a molybdenum (Mo) based metal such as molybdenum, a molybdenum alloy, or the like, chromium (Cr), tantalum (Ta), titanium (Ti), and the like. However, the gate line 121 may have a multilayer structure including at least two conductive layers having different physical properties.

A gate insulating layer 140 made of silicon nitride (SiNx) or silicon oxide (SiOx) is formed on the gate conductor 121. The gate insulating layer 140 may have a multilayer structure including at least two insulating layers having different physical properties.

A semiconductor 154 made of amorphous silicon, polycrystalline silicon, or the like is formed on the gate insulating layer 140. The semiconductor 154 may include an oxide semiconductor.

Ohmic contacts 163 and 165 are formed on the semiconductor 154. The ohmic contacts 163 and 165 may be made of a material such as n+ hydrogenated amorphous silicon which is heavily doped with n-type impurities such as phosphorus or be made of silicide. The ohmic contacts 163 and 165 may be disposed in pairs on the semiconductor 154. In the case in which the semiconductor 154 is the oxide semiconductor, the ohmic contacts 163 and 165 may be omitted.

The data line 171 including the source electrode 173 and the data conductor including the drain electrode 175 are formed on the ohmic contacts 163 and 165 and the gate insulating layer 140.

The data line 171 includes a wide end portion (not shown) for allowing a connection with other layers or external driving circuits. The data line 171 transfers a data signal and mainly extend in a vertical direction so as to intersect with the gate line 121.

In this case, the data line 171 may have a first bending portion having a curved shape in order to obtain maximum transmittance of the liquid crystal display, wherein the first bending portions are disposed at a middle region of a pixel region The bending portions may form a V shape. The data line 171 at the middle region of the pixel region may further include a second bending portion (not shown) which is bent so as to form a predetermined angle with the first bending portion.

The source electrode 173 is a portion of the data line 171 and is disposed on the same plane as the data line 171. The drain electrode 175 extends parallel to the source electrode 173. Therefore, the drain electrode is in parallel to the portion of the data line 171.

The gate electrode 124, the source electrode 173, and the drain electrode 175 form one thin film transistor together with the semiconductor 154, and a channel of the thin film transistor is formed in the semiconductor 154 between the source electrode 173 and the drain electrode 175.

Since the liquid crystal display according to an exemplary embodiment of the present inventive concept includes the source electrode 173 disposed on the same plane as the data line 171 and the drain electrode 175 which extend parallel to the data line 171, it may increase a channel width of the thin film transistor without increasing an area occupied by the data conductor, thereby making it possible to increase an aperture ratio of the liquid crystal display.

The data line 171 and the drain electrode 175 may be preferably made of a refractory metal such as molybdenum, chromium, tantalum, titanium, and the like, or an alloy thereof, and may have a multilayer structure including a refractory metal layer (not shown) and a low resistance conductive layer (not shown). Examples of the multilayer structure may include a double layer of a chromium or molybdenum (alloy) lower layer and an aluminum (alloy) upper layer and a triple layer of a molybdenum (alloy) lower layer, an aluminum (alloy) middle layer, and a molybdenum (alloy) upper layer.

A first passivation layer 180a is disposed on the exposed portions of the data conductors 171, 173, and 175, the gate insulating layer 140, and the semiconductor 154. The first passivation layer 180a may be made of an organic insulating material, an inorganic insulating material, or the like.

The color filter 80 is formed on the first passivation layer 180a. The color filter 80 may be made of an organic insulating material.

The color filter 80 may uniquely display one of primary colors, wherein examples of the primary colors may include the three primary colors such as red, green, and blue, or yellow, cyan, magenta, and the like. Although not shown, the color filter may further include a color filter displaying a mixed color of the primary colors or white, in addition to the primary colors.

A plurality of color filters 80 may be arranged so as to be spaced apart from each other in a horizontal direction or may also be formed in a stripe shape along a vertical direction.

Although not shown, an overcoat (not shown) may be formed on the color filter 80. The overcoat may include an inorganic insulating material or an organic insulating material.

A common electrode 270 is formed on the overcoat. The common electrode 270 is a first electric field generating electrode. The common electrode 270, which is a planar shape, may be formed on an overall front surface of the substrate 110 and may have an opening part 138 disposed in a region corresponding to the drain electrode 175. That is, the common electrode 270 may have a plate-like shape and substantially covers the overall front surface of the substrate 110.

The common electrodes 270 disposed on adjacent pixels are connected to each other, so as to receive a predetermined magnitude of common voltage supplied from the outside of the display region.

A second passivation layer 180b is formed on the common electrode 270. The second passivation layer 180b may be made of an organic insulating material, an inorganic insulating material, or the like.

A pixel electrode 191 is formed on the second passivation layer 180b. The pixel electrode 191 includes a curved edge which is substantially in parallel to the first bending portion and the second bending portion of the data line 171. The pixel electrode 191 has a plurality of first cut parts 91 and includes a plurality of first branch electrodes 192 defined by the plurality of first cut parts 91.

The first passivation layer 180a and the second passivation layer 180b have first contact holes 185 formed therein so as to expose the drain electrode 175. The pixel electrode 191 is physically and electrically connected to the drain electrode 175 through the first contact hole 185 and is applied with a voltage from the drain electrode 175.

A light blocking member 220 is formed on the pixel electrode 191 and the second passivation layer 180b. The light blocking member 220 includes a first light blocking member 220a and a second light blocking member 220b. The first light blocking member 220a is in parallel to the data line and extends in the vertical direction. The second light blocking member 220b is in parallel to the gate line and extends in the horizontal direction. An edge of the light blocking member 220 may be formed so as to overlap an edge of the color filter 80.

A spacer 240 is disposed on the light blocking member 220. The spacer 240 is formed in a shape in which it protrudes toward an upper substrate 210 in the second light blocking member 220b and may be formed of the same material as the light blocking member 220. The spacer 240 includes a main column spacer (MCS) and a sub column spacer (SCS).

The main column spacer (MCS) is disposed on the first light blocking member 220a or the second light blocking member 220b. That is, the main column spacer (MCS) may be formed on a portion in which the first light blocking member 220a and the second light blocking member 220b intersect with each other.

The sub column spacer (SCS) may be disposed on the second light blocking member 220b. The sub column spacer (SCS) may have a shape in which it is in parallel to the gate line 121 and extend along a direction in which the gate line 121 extends.

The sub column spacer (SCS) is disposed so as to correspond to the main column spacer (MCS). That is, the sub column spacer (SCS) and the main column spacer (MCS) may be disposed on a straight line. Thereby, a horizontal center line of the sub column spacer (SCS) and a horizontal center line of the main column spacer (MCS) may be disposed at the same position.

The sub column spacer (SCS) may be formed to have a height lower than a height of the main column spacer (MCS) and higher than a height of the light blocking member 220.

The main column spacer (MCS) serves to support an interval between an upper display panel 200 and a lower display panel 100 and the sub column spacer (SCS) assists the role of the main column spacer (MCS), thus maintaining the interval between the upper display panel 200 and the lower display panel 100 when the main spacer MCS fails to maintain the cell gap between an upper display panel 200 and a lower display panel 100.

Although not shown, a first alignment layer 11 is formed on the spacer 240. The first alignment layer may be a horizontal alignment layer, may be aligned in a predetermined direction, and may be a photo-alignment layer.

Next, the upper display panel 200 will be described.

Although not shown, a second alignment layer is formed on a second insulating substrate 210 made of transparent glass, plastic, or the like. The second alignment layer may be a horizontal alignment layer, may be aligned in a predetermined direction, and may be a photo-alignment layer.

The first alignment layer 11 and the second alignment layer 21 may be made of an alignment material such as polyamic acid, polysiloxane, polyimide, or the like.

The liquid crystal layer 3 is disposed between the lower display panel 100 and the upper display panel 200 and includes a liquid crystal material having positive dielectric constant anisotropy.

The liquid crystal layer 3 has liquid crystal molecules in which a long axis direction thereof is arranged in a direction parallel to the display panels 100 and 200.

The structure of the thin film transistor described with reference to FIGS. 3 to 5 is merely one example, and the layer structure including the structure of the thin film transistor may be variously modified.

Hereinafter, a method for manufacturing a liquid crystal display according to an exemplary embodiment of the present inventive concept will be described with reference to FIG. 6.

Figure 6:
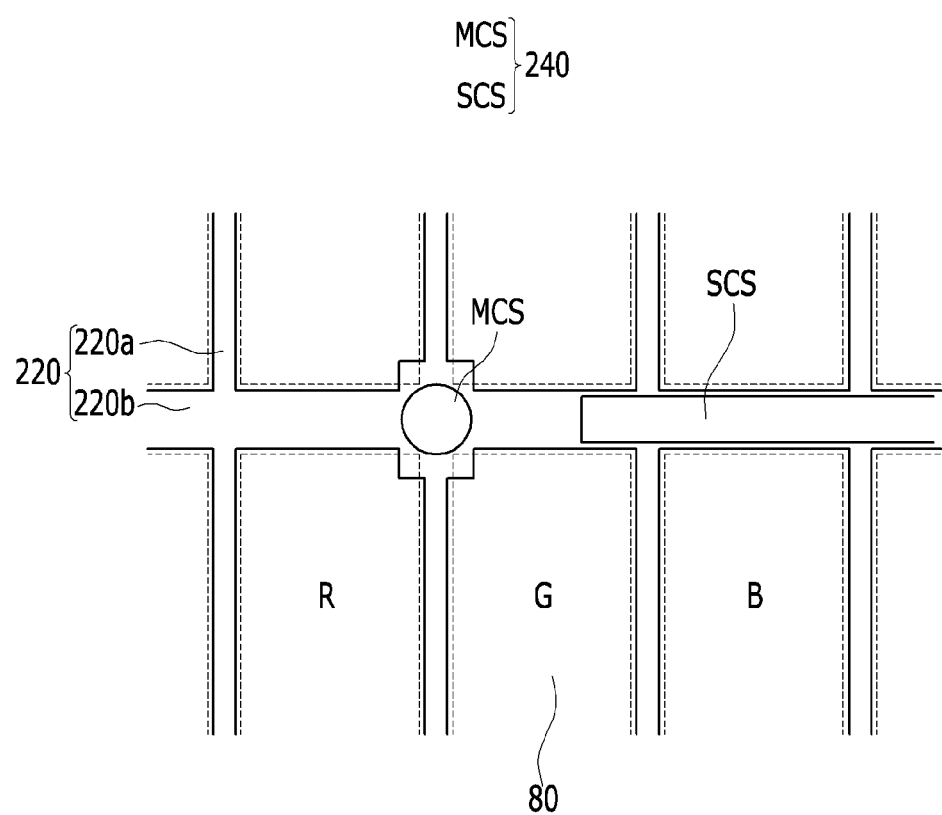
FIG. 6 is a plan view showing a method for manufacturing a liquid crystal display according to an exemplary embodiment of the present inventive concept.

FIG. 6 is a plan view showing a method for manufacturing a liquid crystal display according to an exemplary embodiment of the present inventive concept.

Referring to FIG. 6, a plurality of color filters 80 are formed so as to overlap each other in a horizontal direction or to be spaced apart from each other by a predetermined interval. The plurality of color filters 80 may be formed so that a red color filter, a green color filter, and a blue color filter are sequentially repeated along the horizontal direction.

Although a description is omitted, the layer structure 120 including the structure of the thin film transistor is formed on the lower substrate and the color filter 80 is formed on the layer structure, as described in FIGS. 3 to 5.

The color filter 80 may be formed by a photolithography process and may also be formed by an inkjet method, or the like. For example, in the case in which the red color filter, the green color filter, and the blue color filter are formed by using the photolithography process, the red color filter is first formed using a mask and the mask is then shifted, thereby making it possible to form the green color filter. After the green color filter is formed, the mask is then shifted, thereby making it possible to form the blue color filter.

After forming the color filter 80, the common electrode 270 and the second passivation layer 180b is formed on the color filter 80. A contact hole exposing the drain electrode 175 is formed through the first passivation layer 180a and the second passivation layer 180b. The pixel electrode 191 is ford on the second passivation layer 180b to be connected to the drain electrode 175. The light blocking member 220 and the spacer 240 are formed on the pixel electrode 191.

The light blocking member 220 includes a first light blocking member 220a extending along the data line 171 and a second light blocking member 220b extending along the gate line 121. The light blocking member exposes a display area and covers non-display area.

According to the present exemplary embodiment, the first light blocking member 220a is formed between the color filters 80 which are adjacent to each other in the horizontal direction and the second light blocking member 220b is formed between the color filters 80 which are adjacent to each other in the vertical direction, both of which are formed so as to cover the thin film transistor. However, the first light blocking member 220a and the second light blocking member 220b may be formed on the color filters 80 when the color filters 80 overlap each other in a horizontal direction or the color filters 80 are formed in a stripe shape along a vertical direction. The spacer 240 includes a main column spacer (MCS) and a sub column spacer (SCS) that are formed so as to be spaced apart from each other by a predetermined interval.

The main column spacer (MCS) may be disposed on a portion in which the first light blocking member 220a and the second light blocking member 220b intersect with each other and the sub column spacer (SCS) may be disposed on the second light blocking member 220b between the main column spacer (MCS).

The sub column spacer (SCS) may be disposed so as to correspond to the main column spacer (MCS) and may have a shape in which it extends along a direction in which the second light blocking member 220b extends. A horizontal center line of the sub column spacer (SCS) described above may be disposed at the same position as a horizontal center line of the main column spacer (MCS).

In order to simultaneously form the light blocking member 220 and the spacer 240, the light blocking member 220 and the spacer 240 may be formed by using the mask. Specifically, in order to form the light blocking member 220 and the spacer 240 on the color filter 80, a photo resist (PR) which can block light is formed. Here, the photo resist may be a positive photo resist.

The mask is disposed on the PR on which the color filter is formed. After a exposing the PR, the exposed portion of the PR is developed to form the main column space (MCS), the sub column spacer (SCS) and the light blocking member 220. The main column spacer (MCS) is formed at a region in which the PR is exposed, the sub column spacer (SCS) having a height lower than the main column spacer (MCS), and the light blocking member 220 having the lowest height is formed at a region in which the PR is partially exposed. The transmittance of the mask in a region corresponding to the light blocking member 220 is higher than that in the region corresponding to the sub column spacer (SCS).

The light blocking member 220, the main column spacer (MCS), and the sub column spacer (SCS) may be formed of the same material.

Next, the upper substrate is prepared and the upper display panel and the lower display panel are bonded. The liquid crystal layer is formed in a space between the upper display panel and the lower display panel. In this case, the liquid crystal layer may be formed by being injected by a vacuum injecting method or may be formed by a one drop filling method.

The light blocking member 220 and the spacer 240 according to the present exemplary embodiment may be simultaneously formed and the liquid crystal display having the spacer 240 which can maintain the cell gap stably may be formed.

Meanwhile, although the case in which the light blocking member 220 and the spacer 240 are disposed on the lower substrate 110 has been described in FIGS. 1 to 6 by way of example, the present inventive concept is not limited thereto. For example, the light blocking member 220 and the spacer 240 may also be disposed on the upper substrate 210.

Although the preferred embodiments of the present inventive concept have been disclosed for illustrative purposes, those skilled in the art will appreciate that various modifications, additions and substitutions are possible, without departing from the scope and spirit of the inventive concept as disclosed in the accompanying claims. Accordingly, such modifications, additions and substitutions should also be understood to fall within the scope of the present inventive concept.

What is claimed is:

1. A liquid crystal display comprising:
    a first insulating substrate;
    a thin film transistor disposed on the first insulating substrate;
    a light blocking member disposed on the thin film transistor; and
    a spacer disposed on the light blocking member,
    wherein the spacer includes a main column spacer and a sub column spacer, and the sub column spacer is disposed between two adjacent main column spacers and has a stripe shape which extends in parallel to a gate line of the thin film transistor,
    wherein a length of the sub column spacer which extends substantially parallel to the gate line is longer than a width of the sub column spacer which extends substantially perpendicular to the gate line, and wherein the length of the sub column spacer is longer than a width of a color filter which extends substantially parallel to the gate line.

2. The liquid crystal display of claim 1, wherein:

a first horizontal center line which extends parallel to the gate line and intersects a center of the main column spacer and a second horizontal center line which extends parallel to the gate line and intersects a center of the sub column spacer project onto a same line.

3. The liquid crystal display of claim 1, wherein:

the light blocking member includes:

a first light blocking member extended along a data line of the thin film transistor; and a second light blocking member extended along the gate line of the thin film transistor.

4. The liquid crystal display of claim 3, wherein:

the sub column spacer has a width smaller than that of the second light blocking member.

5. The liquid crystal display of claim 3, wherein:

the main column spacer is disposed on the first light blocking member or the second light blocking member and the sub column spacer is disposed on the second light blocking member.

6. The liquid crystal display of claim 3, wherein:

the main column spacer is formed on a portion in which the first light blocking member and the second light blocking member intersect with each other.

7. The liquid crystal display of claim 1, wherein:

the light blocking member and the spacer are formed of the same material.

8. The liquid crystal display of claim 1, wherein:

the sub column spacer has a height higher than a height of the light blocking member and lower than a height of the main column spacer.

9. The liquid crystal display of claim 1, further comprising:

a first electrode disposed on the thin film transistor; and a second electrode disposed so as to have a passivation layer between the first electrode and the second electrode.

10. The liquid crystal display of claim 9, wherein:

the first electrode has a planar shape formed on a front surface of the pixel region, the second electrode includes a plurality of branch electrodes, and the plurality of branch electrodes are overlapped with the first electrode of the planar shape.

* * * * *